United States Patent [19]

Takeuchi et al.

[11] Patent Number: 4,817,617
[45] Date of Patent: Apr. 4, 1989

[54] DIAGNOSTIC IMAGING APPARATUS

[75] Inventors: Yasuhito Takeuchi; Takao Higashiizumi; Hideya Akasaka; Takao Jibiki; Shinichi Sano, all of Tokyo, Japan

[73] Assignee: Yokogawa Medical Systems, Limited, Tokyo, Japan

[21] Appl. No.: 171,191

[22] Filed: Mar. 7, 1988

Related U.S. Application Data

[63] Continuation of Ser. No. 844,179, filed as PCT JP85/00397 on July 13, 1985, published as WO86/00516 on Jan. 30, 1986, abandoned.

[30] Foreign Application Priority Data

Jul. 16, 1984 [JP] Japan .................................. 147080

[51] Int. Cl.[4] .............................................. A61B 10/00
[52] U.S. Cl. ........................... 128/660.05; 128/661.01; 128/661.09
[58] Field of Search ...................... 128/660.05, 661.01, 128/661.09

[56] References Cited

U.S. PATENT DOCUMENTS 4,254,662  3/1981  Kuroda et al. ........................ 73/626
4,407,293 10/1983  Sworey, Jr. et al. ............... 128/660
4,448,076  5/1984  van Heelsbergen .................. 73/626
4,509,525  4/1985  Seo ...................................... 128/663
4,622,634 11/1986  Fidel .................................. 73/626 X

FOREIGN PATENT DOCUMENTS 2112937  7/1983  United Kingdom ................ 128/660

Primary Examiner—Francis Jaworski
Attorney, Agent, or Firm—Moonray Kojima

[57] ABSTRACT

A diagnostic imaging apparatus is disclosed in which an ultrasonic wave transmit/receive apparatus is used in common for both 2-dimensional B-mode imaging and for measurement of pulsed Doppler signals, by time sharing operation. The good real time characteristics of 2-dimensional B-mode imaging are retained, together with a sufficiently high data rate for pulsed Doppler measurement, through use of simple means for performing interpolation in the Doppler signals Ultrasonic wave transmit/receive means (21,23 to 25,27) repetitively execute combinations of ultrasonic wave transmit/receive sequences, each combination consisting of a plurality of pulsed Doppler mode ultrasonic wave transmit/receive sequences and a single 2-dimensional B-mode imaging ultrasonic wave transmit/receive sequence. Demodulator means (38 to 41) demodulate the Doppler signals, based on the received signals that are acquired during the pulsed Doppler mode ultrasonic wave transmit/receive sequences. Sampling means (42 to 44) perform range gate sampling of the demodulated Doppler signals, and interpolation means (45) interpolate sampling values into the Doppler signal to replace sampling values which are lost during execution of the 2-dimensional B-mode imagaing ultrasonic wave transmit/receive sequences. Doppler signal processing means (46 to 48) perform processing of the sampling signals following interpolation. 2-dimensional B-mode imaging means process the received signal that is acquired by the 2-dimensional B-mode imaging sequences.

3 Claims, 4 Drawing Sheets

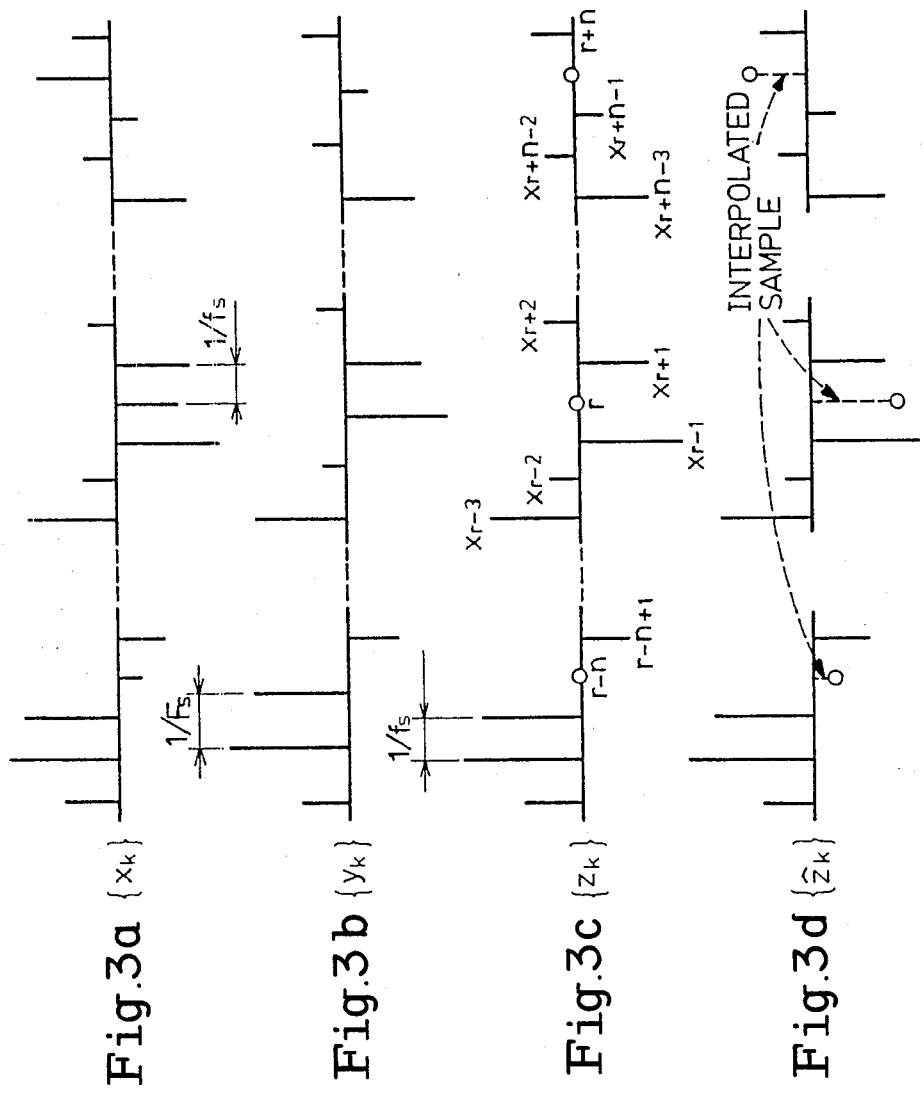

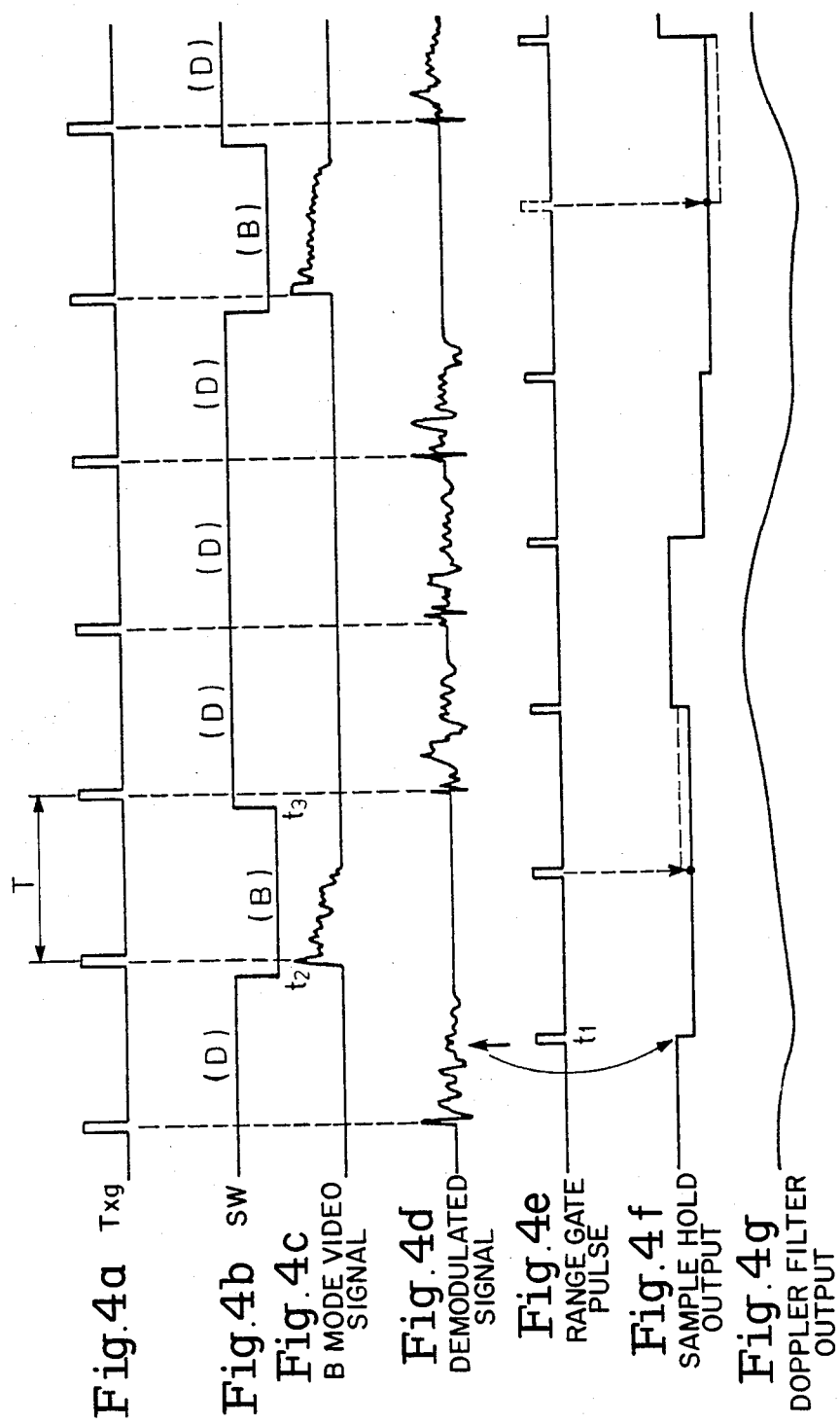
Fig.4a Txg
Fig.4b SW
Fig.4c B MODE VIDEO SIGNAL
Fig.4d DEMODULATED SIGNAL
Fig.4e RANGE GATE PULSE
Fig.4f SAMPLE HOLD OUTPUT
Fig.4g DOPPLER FILTER OUTPUT

DIAGNOSTIC IMAGING APPARATUS

This application is a continuation of Ser. No. 844,179 filed as PCT JP85/00397 on Jul. 13, 1985, published as WO86/00516 on Jan. 30, 1986 and now abandoned.

TECHNICAL FIELD

The present invention relates to a diagnostic imaging apparatus whereby both 2-dimensional B-mode imaging and acquisition of a Doppler signal by the pulsed Doppler technique can be performed in real time operation, in a mutually harmonious manner.

BACKGROUND ART

Generally speaking, diagnostic imaging employing ultrasonic waves is performed by 2-dimensional B-mode imaging. With 2-dimensional B-mode imaging, the object body under diagnosis is irradiated by ultrasonic waves, and the resultant ultrasonic echo waves are received and converted into electrical signals, and processed to form a 2-dimensional image. The image primarily shows the spatial distribution of the echo source intensity within the body under diagnosis. This image is displayed on a display apparatus such as a CRT. Other types of diagnostic imaging technique include M-mode imaging as well as the pulsed Doppler technique. By means of the pulsed Doppler technique detecting the Doppler effect, movement within the object body under diagnosis (for example, movement of the heart, blood flow in the blood vessels, etc.) can be examined.

However, using the pulsed Doppler technique, it is essential to employ an imaging apparatus whereby the sampling points for the pulsed Doppler system can be set by the operator while the operator observes the 2-dimensional B-mode image in real time. In this way, the positioning of the sampling points from which Doppler data is to be derived, and hence the positions of the corresponding echo source, can be performed by the operator so as to track continuously or in step to the regions of interest within the object body under diagnosis.

In the prior art of diagnostic imaging apparatus, it has been difficult to perform time sharing data acquisition in real time for both the 2-dimensional B-mode imaging operation and the pulsed Doppler operation, without mutual interference in between. Hereinafter, the respective modes of these two operations will be referred to as the B and D modes. More specifically, if it is attempted, with such a prior art type of diagnostic imaging apparatus, to fully exploit the real time operation capability of 2-dimensional B- mode imaging, it is necessary to allocate part of the pulse echo sequences to the B-mode and another sequence to the pulsed Doppler mode. Here, the pulse echo sequences are to be determined so as to have maximum available pulse repetition rate for each given depth of penetration, for example, about 4 kHz for body scanning. Among these pulse echo sequences, half of them might be allocated to the B mode and the other half to the pulsed Doppler mode. In this way, each mode is successively executed in half of entire pulse sequences. With this method the data rate for the pulsed Doppler mode is one half of the rate for the case where the entire pulse sequences are to the pulsed Doppler mode. Thus, the maximum detectable Doppler shift will be extremely low if observation is to be performed such that no Doppler ambiguity will arise. In other words, in such a case, arterial blood flow signal of the normal subject may already get too high Doppler shift for such system to cause its spectrum to reach the folded back region. in the spectrum display. Thus, it is practically impossible to carry out proper diagnosis for .even higher Doppler shift region, which means a considerable limitation in practice.

Conversely, in order to overcome this problem, if entire pulse echo sequences are dedicated to the pulsed Doppler mode, then it becomes impossible to obtain a 2-dimensional B-mode image to determine the sample point position. This will cause erroneous reading by the operator. It might be suggested that it would be allowed to perform B-mode operation for extremely brief duration to interrupt the execution of the pulsed Doppler mode, i.e. once or twice per second, to momentarily enter the B-mode operation. In this case, if for example, the pulsed Doppler mode is halted for a duration of 20 to 40 milliseconds per second, there will be no significant adverse effect upon observation in the pulsed Doppler mode. However, when this method is employed, it would still be very difficult to determine the positions of the sampling point and the sound beam for pulsed Doppler mode by dynamically following the 2-dimensional B-mode image. It has been considered that this type of problem is unavoidable, if a single echo sounder (having the function of receiving and beam forming the ultrasonic waves) is employed for both the B and D modes in time sharing manner.

A proposal to overcome the above problem has been given in Japanese Patent Laid Open No. 58-89242. With the proposed method using a single beam, during each second of pulsed Doppler mode execution, interruption for of B-mode scanning to form a complete field, or for a part of a field, are repetitively performed at a sufficiently high rate for obtaining a 2-dimensional image having acceptable real time characteristics. During such interruption the Doppler signal is lost for a short time and interpolation for such lost signal in the Doppler signal is performed based on measurement of that signal during rest of time where no B-mode interruption is executed. However, with this method, it is necessary to perform interpolation of the Doppler signal over a comparatively long time interval, for example, 15 milliseconds, for interruption of B-mode operation. The method and means to perform such compensation are complex, and it also is necessary to employ a signal editing means to have continuity between the compensated portions of the Doppler signal and the directly measured portion of the same.

DISCLOSURE OF THE INVENTION

It is an objective of the present invention to provide a diagnostic imaging apparatus which will overcome the problems described above, such that when a single echo is employed for both B and D mode operations in time sharing manner, the real time operational characteristics of 2-dimensional B-mode imaging are also maintained, while a pulsed Doppler signal is acquired at a sufficiently high data rate, with relatively simple Doppler signal interpolation means being employed.

A diagnostic imaging apparatus according to the present invention comprises, ultrasonic wave transit/-receive means (21,23 to 25, 27) which project ultrasonic waves to the body under diagnosis, by repetitively executing a combination of pulse echo sequences, each combination comprising a plurality of pulsed Doppler mode ultrasonic wave transmit/receive sequences and a single 2-dimensional B-mode imaging ultrasonic wave transmit/receive sequence, the apparatus further comprising demodulation means (28 to 41) for demodulating Doppler signals based on received signals that are acquired by a pulsed Doppler mode ultrasonic wave transmit/receive sequence, sampling means (42 to 44) for performing range gate sampling of a demodulated Doppler signal, interpolation means (45) for interpolating sample values in the Doppler signals that have been omitted during execution of the 2-dimensional B-mode imaging ultrasonic wave transmit/receive sequence, Doppler signal processing means (46 to 48) for processing the sampling output signals after interpolation has been performed, and 2-dimensional B-mode imaging means (28 to 34) for processing the received signals that are acquired through the 2-dimensional B-mode imaging ultrasonic wave transmit/receive sequence.

BRIEF DESCRIPTION OF DRAWINGS

FIGS. 3a, 3b, 3c and 3d are timing charts showing the general form of waveforms within the interpolator of FIG. 2, and FIGS. 4a, 4b, 4c, 4e, 4f and 4g are timing charts for assistance in describing the operation of the embodiment of FIG. 1.

BEST MODE OF CARRYING OUT INVENTION

Figure 1:
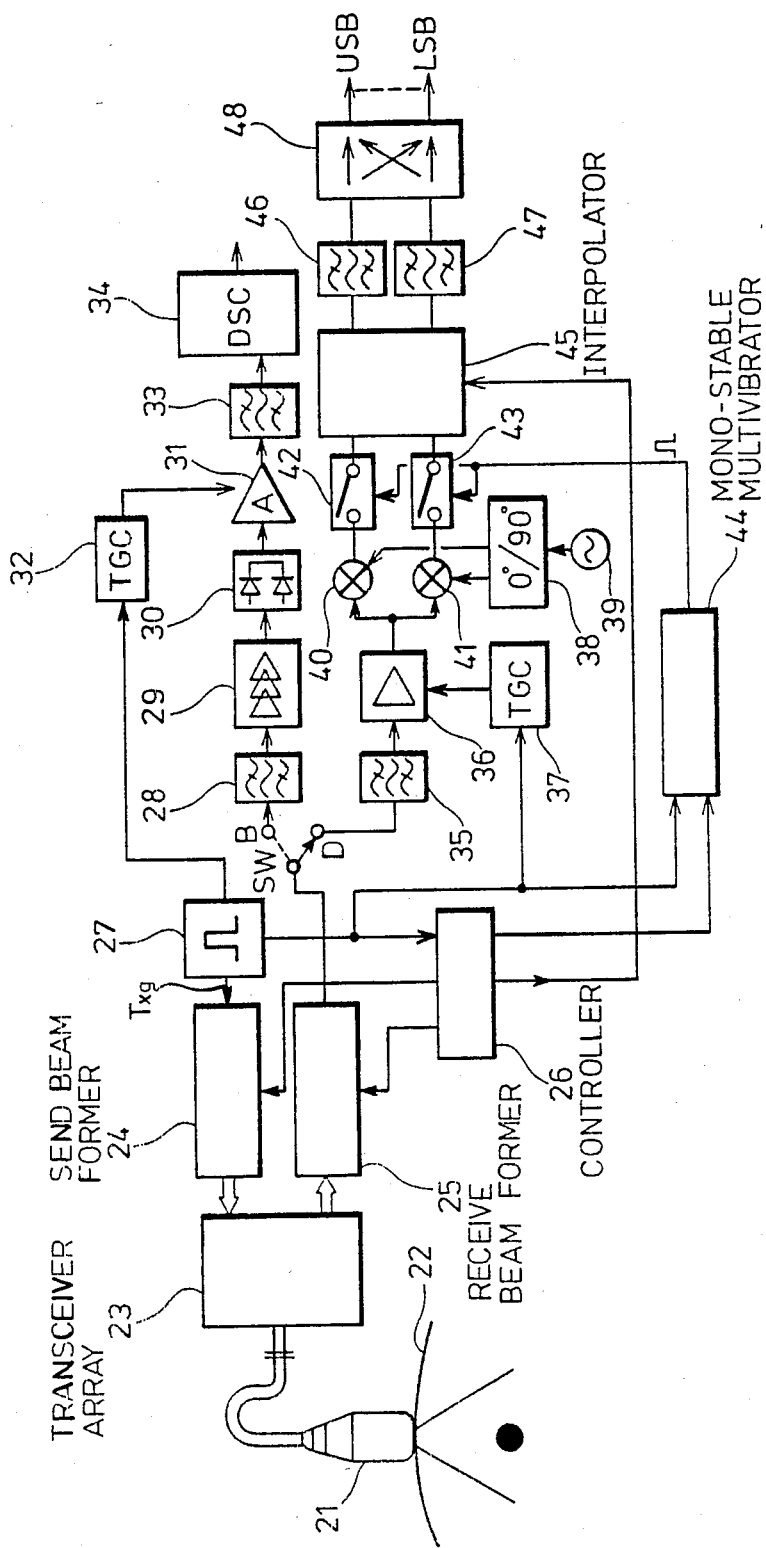
FIG. 1 is a diagram showing the electrical configuration of an embodiment of the present invention.

With a pulsed Doppler system which employs the range gate technique, samples of the baseband Doppler signal are obtained as a complex value, i.e. as a vector, each time a transmit/receive sequence is executed. This is because a pulsed Doppler signal has almost similar characteristics to those of a speech signal within the audible frequency range, so that these characteristics can be considered in the same manner as serially transmitted speech samples, for example, in the same way that speech phonetics are handled in a PCM telephone network.

In the case of transmission of a speech signal, after serial sampling of an audio signal at an 8 kHz sampling rate to produce a serial train of sample values, the data rate is lowered by "thinning out" samples, i.e. by periodically withdrawing sample values. Subsequently, by applying predictive restoration processing in the sampling values, it is possible to practice to restore the original speech signal virtually without distortion. This method is disclosed for example in the Bell System Technical Journal, Vol. 62, No. 6, 1983, in an article entitled "Sample Reduction and Subsequent Adaptive Interpolation of Speech Signals". This article will be referred to in the following as the reference document. Similar considerations to those given in the reference document (with respect to speech signals) are also applicable to the baseband Doppler signals seen in a pulsed or CW Doppler signal. In the reference document, a case is examined to withdraw and restore one sample out of every four successive samples. The form of sampling described is also applicable to Doppler data acquisition by sampling in the pulsed Doppler mode operation.

With the present invention, the time which corresponds to an omitted sample is employed for real time 2-dimensional B-mode imaging. That is to say, during a time interval in which one transmit/receive operation in pulsed Doppler mode is omitted out of four such operations, restoration processing of the data which has been lost during that omission time interval is performed by the pulsed Doppler mode part of the system. During that same omission interval, a transmit/receive operation is performed for one scan line, to obtain data for B-mode image acquisition. If multi-beam reception is performed, then it is possible to examine, for example, four mutually adjacent scan lines at one time. There will be a difference between the quality of the B-mode image that is obtained in this way by multi-beam operation, by comparison with B-mode operation, whereby scan lines are sequentially received, one at a time, throughout the duration of B-mode operation. If two scan lines are received at a time, then it is possible to employ a frame rate which is ½ of the normally utilized rate (e.g. 30 FPS), i.e. a frame rate of 15 FPS can be employed. This will allow real time operation permitting observation of organs such as the heart, etc. Even if only one scan line is received at a time, the lowering of the real time operating characteristics will be within acceptable limits, in many cases. The processing for restoration of data that is lost by omission of one sample using multiple beam reception will now be described.

The interpolation method published in the reference document will first be discussed. If a speech signal is designated $x(t)$, the band limit of the signal is designated as $f_c$(Hz), the sampling frequency is $f_s$(Hz), then according to the sampling theorem, the following equation is true:

$$f_s \geq 2 \cdot f_c \qquad (1)$$

Figure 2:
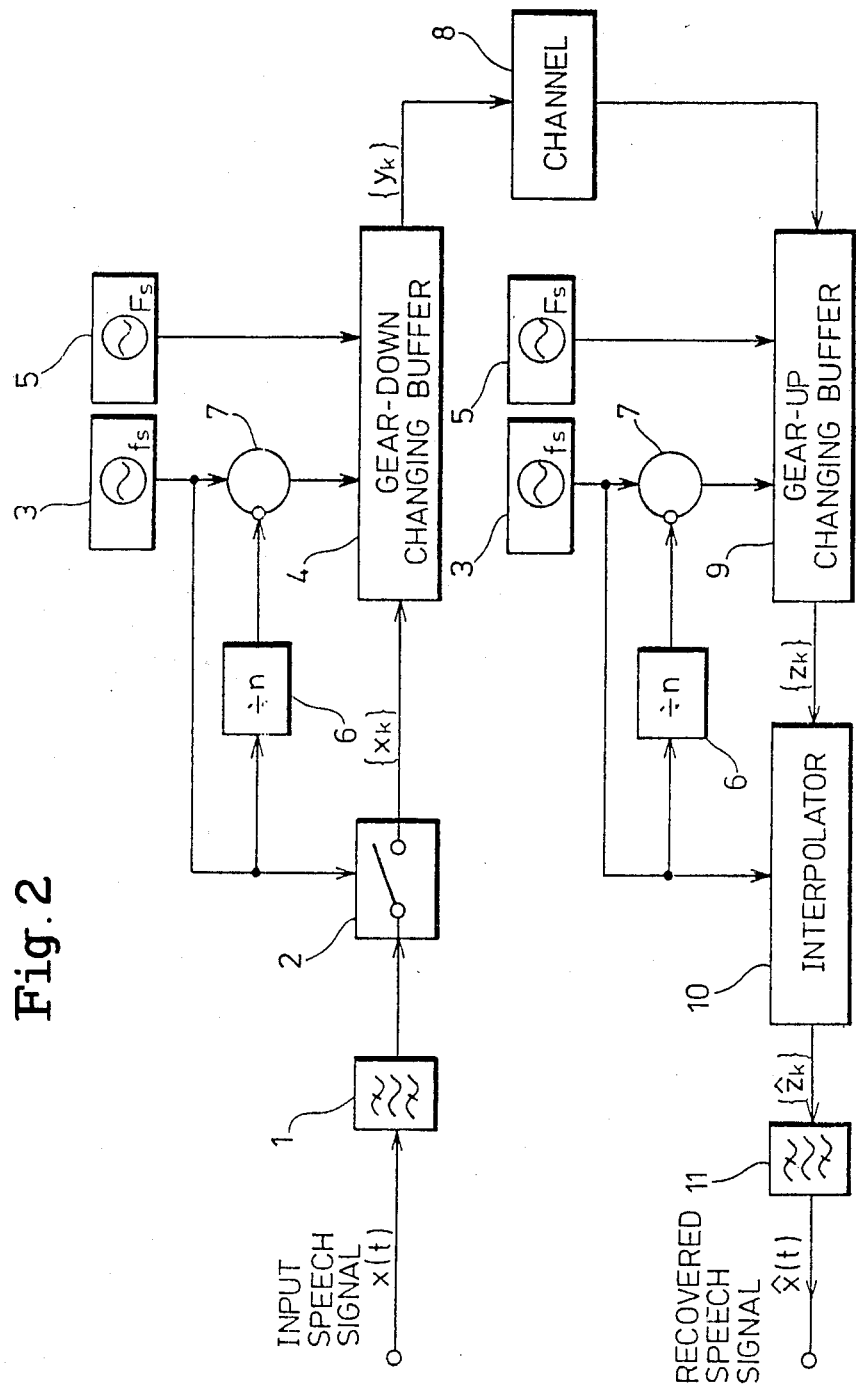
FIG. 2 is a block diagram of an embodiment of an interpolator.

Designating the original signal series as $(x_k)$, it will be assumed that one sample will be omitted in every n sampling operations. FIG. 2 is a block diagram of an embodiment of an interpolator which is directly applicable to the present invention.

After the inputted speech signal $x(t)$ has passed through one frame, it is sampled by sampling circuit 2. The sampling frequency is set as the frequency $f_s$ of a first oscillator 3. The sampled original signal series $(x_k)$ is input to a gear-down changing buffer 4, whereby one in every four samples is omitted, i.e. is cut out of this sampled original signal series. By removal of these samples, the signal is converted to a signal series $(y_k)$ whose frequency is determined by the frequency of oscillation $F_s$ of a second oscillator 5. The relationship between $F_s$ and the band limit $f_c$ is as follows:

$$F_s < 2 \cdot f_c \qquad (2)$$

To execute a sample omission operation, the output signal from the first oscillator 3 is transferred through an inhibit circuit 7, which is controlled by an output signal from a frequency divider circuit 6, and the resultant output signal from inhibit circuit 6 is inputted to the gear-down changing buffer 4.

The resultant compressed signal series $(y_k)$ thereby outputted from the gear-down changing buffer 4 is then transferred through a channel 8 to be inputted to a gear-up changing buffer 9. The gear-up changing buffer 9, as is the case of the gear-down changing buffer 4, receives output signals from the second oscillator 5 and from the inhibit circuit 7, and performs conversion of the signal $(y_k)$ to the signal series $(z_k)$ at the frequency $f_s$. However, this signal series $(z_k)$ has only been restored to the original signal with respect to the signal frequency, and the data that was previously omitted has not yet been interpolated. This signal series $(z_k)$ is then input to an interpolation circuit 10, to form the signal series ($\hat{z}_k$), in which the data that was previously omitted has been restored. This restored signal ($\hat{z}_k$) is then outputted to external circuits through a filter 11.

FIG. 3 is a timing chart for illustrating the general features of waveforms in the interpolator shown in FIG. 2. In FIG. 3, (a) shows the original signal series ($x_k$), (b) shows the compressed signal series ($y_k$), (c) shows the signal series ($z_k$) in which only the signal frequency has been restored, and (d) shows the signal series ($\hat{z}_k$), which has been virtually restored through interpolation. As shown in FIG. 3, there is a period $1/F_s$ between successive sample values. In the case of the original signal series ($x_k$) shown in FIG. 3(a), the period between successive sampling value is $1/f_s$, with the period $1/F_s$ being longer than $1/f_s$. In the case of the signal series ($z_k$), in which only the original signal frequency has been restored, the data that has been previously omitted is still missing, as illustrated in FIG. 3(c). FIG. 3(d) shows the restored signal series ($\hat{z}_k$), in which previously omitted data has been interpolated by the interpolation circuit 10. As shown, this is substantially identical to the original data. The broken line portions in FIG. 3(d) show the interpolated data value.

The degree of accuracy to which the restored signal series ($\hat{z}_k$) approximates the original signal series ($x_k$) is determined by the characteristics of the interpolation circuit 10. The method of interpolation described in the reference document will now be discussed.

Consecutive blocks of data are derived from the signal series ($z_k$), with each block consisting of W samples, and with the blocks being separated by intervals of $1/f_s$. The signal series ($z_k$) is thus configured of blocks of W samples, in each of which one sample has been removed in every n samples. Such as block is configured of the following components:

$$X_1, \ldots x_{n-1}, \hat{z}_n, x_{n+1}, \ldots, x_{w-2}, x_{w-1}, \hat{z}_w$$

In the above, $z_r$ denotes a sample which is to be interpolated, wherein r is an arbitrary value which is one of the following:

$$r = n, 2n, \ldots, W-n, w$$

In interpolating a speech signal sample, $\lambda$ sample values prior to and $\lambda$ sample values following the sample that is to be interpolated are utilized, where $\lambda$ meets the following condition:

$$\lambda \leq n-1 \quad (3)$$

The interpolation data $\hat{z}_r$ for the r'th lost data point is given by the following equation.

$$\hat{z}_r = \sum_{i=\lambda}^{-1} a_i \cdot x_{r+i} + \sum_{i=1}^{\lambda} a_i \cdot x_{r+i} \quad (4)$$

In the above equation (4), $a_i$ is the interpolation coefficient. The equation can be written as follows, assuming that $a_0$ is 0:

$$\hat{z}_r = \sum_{i=\lambda}^{\lambda} a_i \cdot x_{r+i} \quad (5)$$

The interpolation error $e_r$ for the rth sample is given as follows:

$$e_r = x_r - \hat{z}_r \quad (6)$$

According to the reference document, the value of the interpolation error $e_r$ can be minimized if the interpolation coefficient $a_i$ is selected such that the square of the interpolation error $e_r$ given by equation (6), i.e. $e_r^2$ is minimized. It is also stated in the reference document that the interpolation matrix which is used to obtain the interpolation coefficient $a_i$ can be simplified if the the number of samples W in each block is made greater than 256.

It should be noted that the interpolation method to be used with the present invention is not limited to that which has been described in the above, but that various other methods of interpolation can be employed. Examples of such other methods of interpolation are as follows:

(1) Linear interpolation method: With this method, the data that has been lost by omission is interpolated as a point lying on a straight line that connects the two sample points which are respectively adjacent to the omitted sample. This method of interpolation can be employed if the two adjacent samples are available.

(2) Second (or higher) order even number interpolation method: With this method, interpolation can be performed of two sets of n samples for each direction are available, respectively, immediately preceding and succeeding the omitted sample.

The present invention can employ any of the above methods of interpolation. However, if the omission of single sampling values is performed at fixed periodic intervals, then based on considerations of optimum restoration of the sample data, the method which is described in the reference document is to be preferred.

An embodiment of the present invention will now be described, referring to the drawing. FIG. 1 is a diagram showing the electrical configuration of this embodiment, in FIG. 1, reference numeral 21 denotes an ultrasonic probe for directing ultrasonic waves onto a body which is under diagnosis 22, and for receiving the resultant reflected ultrasonic waves. Reference number 23 denotes a transceiver array, for transmitting an ultrasonic wave transmission signal to ultrasonic probe 21 and for receiving a receive signal from ultrasonic wave 21. Reference numeral 24 denotes a transmitting beam former, for transmitting the transmission pulses to transceiver array 23. Receiving beam former 25 accepts the receive pulses from transceiver array 23 and for beam forming of the receive pulses. Reference number 26 denotes a controller, which controls the operation of the transmitting beam former 24 and the receiving beam former 25, and also controls various computation control operations.

Reference number 27 denotes a pulse generator for applying pulse signals to the transmitting beam former 24 and to controller 26. SW denotes a changeover switch which receives the output signal from the receive beam former 25 and connects this signal either to the B-mode imaging side of the system (i.e. the B-side) or to the pulse Doppler signal acquisition side of the system (i.e. the D-side). Reference number 28 denotes a band-pass filter which receives the output signal from changeover switch SW. Reference number 29 denotes a logarithmic amplifier which receives the output signal from band-pass filter 28 and performs amplitude compression of that signal. A detection circuit 30 serves to detect the output signal from the logarithmic amplifier 29. Reference number 31 denotes a video amplifier which receives the output signal from the detector circuit 30 and produces a corresponding video signal output.

Reference number 32 denotes a time gain control circuit, which receives the output signal from the pulse generator 27 and applies to the video amplifier 31 a gain signal which varies in accordance with echo return time. Reference number 33 denotes an anti-aliasing filter which receives the output from the video amplifier 31. A digital scan converter (DSC) 34 receives the output signal from filter 33. This digital scan converter 34 responds to a specific control signal by converting data that has been read out in the vertical direction into horizontally oriented data, and produces this data as an output.

Reference number 35 denotes a band-pass filter which receives the output signal from changeover switch SW. A linear amplifier 36 receives the output signal from the band-pass filter 35. Reference number 37 denotes a time gain control circuit which receives the output signal from pulse generator 27 and supplies a gain signal, which varies in accordance with time, to the linear amplifier 36. A phase shifter 38 receives the output signal from a local oscillator 39 and converts this signal into two signals having 90° different phases. Reference numbers 40,41 denote demodulators (BDMs) each of which receives the output signal from the linear amplifier 36, with one of the above mentioned signals differing in phase by 90° from phase shifter 38 also being input to the demodulator 40 and the other phase-shifted signal being input to the demodulator 41. Reference numbers 42,43 denote sample-and-hold circuits which receive the output signals from the demodulators 40,41 respectively, and perform sampling of these signals at given intervals. Reference number 44 denotes a monostable multivibrator circuit which receives the output signals from the pulse generator and from controller 26, and generates range gate sampling pulses. The output signal from the monostable multivibrator 44 is applied to the sample-and-hold circuits 42,43, to determine the timings of sampling by these circuits.

Reference number 45 denotes an interpolator which receives output signals from sample-and-hold circuits 42,43 and interpolates the data that has been lost by omission of samples. A timing signal to notify the timing of the omission is supplied from controller 26 to interpolator 45. The interpolator 45 may have a circuit configuration such as that shown in FIG. 2.

As described with reference to FIG. 2, the interpolation method performs optimization on the basis of selection of the interpolation coefficient such as to minimize the value of the square of the interpolation error $e_r$, i.e. to minimize the value of $e_r^2$, where $e_r$ is in accordance with above equation (6). However, as hereinbefore described, it should be noted that the present invention is not limited to this one method of interpolation, but that it is equivalently possible to use other kinds of interpolation methods, such as linear interpolation.

Reference numbers 46,47 respectively, denote Doppler filters, which respectively receive output signals from the interpolator 45. A signal combiner circuit 48 receives output signals from Doppler filters 46,47 and performs Hilbert transformation of these signals. After performing first order combination of the data, combiner circuit 48 combines to form directional baseband Doppler signals for each direction, i.e. produces as output signals a pair of baseband (audible frequency)-Doppler signal range corresponding to the USB (upper side band) and LSB (lower side band). The operation of these circuits will be described in detail with reference to the timing chart of FIG. 4.

In FIG. 4, (a) shows the output signal Txg from the pulse generator 27, (b) shows the output signal from changeover switch SW, (c) shows the waveform of the echo video signal in B-mode, i.e. the output from filter 33, (d) shows the output signal waveform from the demodulator 40, (e) shows the range gate pulses (i.e. the output signal from monostable multivibrator 44), (f) shows the output signal from the sample-and-hold circuit 42, and (g) shows the output signal from either of Doppler filters 46,47.

The output pulses from pulse generator 27 have the form shown in FIG. 4(a), and these are transferred through transmission beam former 24 and the transceiver array 23 to form output of the ultrasonic probe 21 being directed into object body 22 under diagnosis. The ultrasonic waves entering into object body 22 causes echo waves from echogenic portions within the body 22. These echo waves come back through ultrasonic probe 21 and transceiver array 23, to form input to the receiving beam former 25. The echo signal is thereby arranged by the receiving beam former 25, and the beam formed signal is fed to the changeover switch SW. Assuming that the changeover switch SW is switched to the D-side, (i.e. to the pulse Doppler mode of the system), which is the condition assumed in FIG. 4(b), then after components of the echo signal within a specific frequency range have been derived from that signal, by band-pass filter 35, these signal components are subjected to time gain control by linear amplifier 36. The time gain controlled echo signal is then modulated by the 90° phase- shifted carrier RF(AC) AC signals, in demodulators 40,41, to be converted to demodulated signals having the form shown in FIG. 4(d). As shown in FIG. 4(e), the demodulated signals are then subjected to sample and hold operations by sample-and-hold circuits 42,43., with a period between sample and hold operations which is equal to the period of the range gate pulses (sampling pulses). If a sampling pulse is generated at time point $t_1$, then the demodulated signals are sampled at time $t_1$, whereby a "hold" output signal is obtained having the form shown in FIG. 4(f).

Next, if the changeover switch SW is changed over to the B-mode position at time point $t_2$, as in FIG. 4(b), then the echo signal will be transferred through band-pass filter 28 and the logarithmic amplifier 29, whose output is fed to detection circuit 30. The input signal to the detection circuit 30 is detected to produce a video signal. This video signal is then subjected to gain control by video amplifier 31, and the resultant signal is passed through filter 33. The output signal from filter 33 constitutes a B-mode echo video signal, having the form shown in FIG. 4(c), and this is input to the digital scanning converter 34. This input of the echo video signal for one transmit/receive operation in B-mode imaging is completed within one sampling period T. If multiple beam receiving is performed, then echo video signals for a plurality of scan lines can be obtained at one time. The digital scan converter 34 receives the echo video signal series, acquired by scanning the object body under diagnosis with ultrasonic waves in the vertical direction, and converts this signal series into a horizontally oriented scanning video signal which can be applied to a CRT monitor for a television format display.

During each interval in which B-mode imaging is being performed, the monostable multivibrator 44 does not generate a sampling pulse. This is illustrated in FIG. 4(e). That is to say, during an interval in which B-mode imaging is performed, one pulse Doppler mode sample is omitted. At time $t_3$, if changeover switch SW is again set to the pulsed Doppler mode position thereof, then the operation described above is repeated and a "hold" output is again produced by the sample-and-hold circuit 42, as shown in FIG. 4(f). As can be seen from FIG. 4, such pulsed Doppler mode operations are successively repeated during three consecutive periods, and then the B-mode is again entered. More specifically, the circuit shown in FIG. 1 employs one sampling period for B-mode imaging out of every four periods and employs the remaining three periods for pulsed Doppler mode operations. Regarding this from the aspect of the pulsed Doppler mode system, it can be considered that data is omitted at a rate of one in every four samples. The interpolator 45 restores the samples that have been thereby omitted from the sample data, as described hereinbefore by utilizing one of several possible interpolation methods. The resultant data is the output from the signal combiner circuit 48 as the Doppler signals.

In the operation described above, one in every four samples is omitted. However, it should be noted that the present invention is not limited to this, and the rate at which samples are omitted can be freely determined, so long as the date rate of omission is such that the desired baseband Doppler signals can be restored virtually without distortion.

In addition, the intervals between successive omissions of samples need not necessarily be made strictly periodically. It is possible to employ means for controlling the omission of samples whereby the intervals between omissions follow som fixed rule, or are made to occur in a random manner. Such alternative manner for determining the intervals between omissions of samples also fall within the scope which is claimed for the present invention.

As described in detail above, the present invention enables a diagnostic imaging apparatus to be provided whereby during pulse Doppler mode sampling, single samples are periodically omitted, and during the time intervals corresponding to these omitted samples, 2-dimensional B-mode imaging is executed. The pulsed Doppler mode samples that have thus been omitted are subsequently restored, by interpolation of corresponding data, to thereby enable virtually perfect Doppler signal to be acquired. If a single echo sounder is utilized in time sharing operation for both B and D mode operation, the real time characteristics of both modes of operation are sufficiently retained, while acquisition of Doppler signals by pulsed Doppler mode operation is performed at a specific data rate, so that extremely accurate data acquisition is possible.

The preferred method of implementing the present invention has been described above. However, it will be possible for persons skilled in the art to envisage various modifications to the embodiment above described, which fall within the scope claimed for the invention as set out in the appended claims.

I claim:

1. A diagnostic imaging apparatus for multibeam reception from a plurality of acoustic scan lines, said apparatus comprising
   a common transducer means for scanning a plurality of scan lines;
   control means;
   first means under the control of said control means for applying ultrasonic wave pulses of multiple beams to said transducer means to radiate an object body under diagnosis through said plurality of scan lines;
   second means under the control of said control means for receiving echo signals from said transducer means resulting from echo signals emanating from said body in response to said multiple beams of ultrasonic pulses, said echo signals comprising successive cycles of a plurality of Doppler components and a single 2-dimensional B-mode component in each cycle;
   demodulator means;
   2-dimensional B-mode imaging means;
   switching means under control of said control means for selectively connecting said second means to said imaging means during a time said echo signals comprise said 2-dimensional B-mode component, and for selectively connecting said second means to said demodulator means during a time said echo signals comprise said plurality of Doppler components;
   wherein said 2-dimensional B-mode imaging means after connecting by said switching means to said second means processes said 2-dimensional B-mode component outputted from said common transducer means and said second means, into signals for registering;
   wherein said demodulator means after connecting by said switching means to said second means generates demodulating signals based on the Doppler components outputted from said common transducer means and said second means;
   sampling means under control of said control means and connected to said demodulating means for performing range gate sampling of the demodulated signals generated by said demodulating means and for generating sampling values;
   interpolating means under control of said control means and connected to said sampling means for interpolating the sampling values outputted from said sampling means and for restoring lost sample values of Doppler signals lost during receipt of said B-mode components by said common transducer means to provide a restored Doppler component;
   Doppler signal processing means under control of said control means and connected to said interpolating means for processing the sampling values after interpolating by said interpolating means; and
   scan and Doppler register means for registering for each cycle measurements for said plurality of Doppler components and measurement for said 2-dimensional B-mode component and measurements for said restored Doppler component lost during the time the B-mode component is being received by said common transducer means;
   wherein said interpolation means comprises means for interpolating the r'th value of interpolation values satisfying the following equation $$\hat{z}_r = \sum_{i=-\lambda}^{\lambda} a_i \cdot x_{r+i}$$

wherein $\lambda$ is number of sampling pulses respectively preceding and succeeding an interpolation point, $a_i$ is interpolation coefficient, and $x_{r+i}$ is an actual sampling value preceding and succeeding said interpolation point.

2. A diagnostic imaging apparatus for multibeam reception from a plurality of acoustic scan lines, said apparatus comprising a common transducer means for scanning a plurality of scan lines;

control means;

first means under the control of said control means for applying ultrasonic wave pulses of multiple beams to said transducer means to radiate an object body under diagnosis through said plurality of scan lines;

second means under the control of said control means for receiving echo signals from said transducer means resulting from echo signals emanating from said body in response to said multiple beams of ultrasonic pulses, said echo signals comprising successive cycles of a plurality of Doppler components and a single 2-dimensional B-mode component in each cycle;

demodulator means;

2-dimensional B-mode imaging means;

switching means under the control of said control means for selectively connecting said second means to said imaging means during a time said echo signals comprise said 2-dimensional B-mode component, and for selectively connecting said second means to said demodulator means during a time said echo signals comprise said plurality of Doppler components;

wherein said 2-dimensional B-mode imaging means after connecting by said switching means to said second means processes said 2-dimensional B-mode component outputted from said common transducer means and said second means, into signals for registering;

wherein said demodulator means connecting by said switching means to said second means generates demodulating signals based on the Doppler components outputted from said common transducer means and said second means;

sampling means under control of said control means and connected to said demodulating means for performing range gate sampling of the demodulated signals generated by said demodulating means and for generating sampling values;

interpolating means under the control of said control means and connected to said sampling means for interpolating the sampling values outputted from said sampling means and for restoring lost sample values of Doppler signals lost during receipt of said B-mode components by said common transducer means to provide a restored Doppler component;

Doppler signal processing means under control of said control means and connected to said interpolating means for processing the sampling values after interpolating by said interpolating means; and scan and Doppler register means for registering for each cycle measurements for said plurality of Doppler components and measurement for said 2-dimensional B-mode component and measurements for said restored Doppler component lost during the time the B-mode component is being received by said common transducer means;

wherein said interpolation means comprises means for executing linear interpolation based upon one sampling value immediately preceding an interpolation point and one sampling value immediately succeeding said interpolation point.

3. A diagnostic imaging apparatus for multibeam reception from a plurality of acoustic scan lines, said apparatus comprising a common transducer means for scanning a plurality of scan lines;

control means;

first means under control of said control means for applying ultrasonic wave pulses of multiple beams to said transducer means to radiate an object body under diagnosis through said plurality of scan lines;

second means under control of said control means for receiving echo signals from said transducer means resulting from echo signals emanating from said body in response to said multiple beams of ultrasonic pulses, said echo signals comprising successive cycles of a plurality of Doppler components and a single 2-dimensional B-mode component in each cycle;

demodulator means;

2-dimensional B-mode imaging means;

switching means under control of said control means for selectively connecting said second means to said imaging means during a time said echo signals comprise said 2-dimensional B-mode component, and for selectively connecting said second means to said demodulator means during a time said echo signals comprise said plurality of Doppler components;

wherein said 2-dimensional B-mode imaging means after connecting by said switching means to said second means processes said 2-dimensional B-mode component outputted from said common transducer means and said second means, into signals for registering;

wherein said demodulator means after connecting by said switching means to said second means generates demodulating signals based on the Doppler components outputted from said common transducer means and said second means;

sampling means under control of said control means and connected to said demodulating means for performing range gate sampling of the demodulated signals generated by said demodulating means and for generating sampling values;

interpolating means under control of said control means and connected to said sampling means for interpolating the sampling values outputted from said sampling means and for restoring lost sample values of Doppler signals lost during receipt of said B-mode components by said common transducer means to provide a restored Doppler component;

Doppler signal processing means under control of said control means and connected to said interpolating means for processing the sampling values after interpolating by said interpolating means; and scan and Doppler register means for registering for each cycle measurements for said plurality of Doppler components and measurement for said 2-dimensional B-mode component and measurements for said restored Doppler component lost during the time the B-mode component is being received by said common transducer means;

wherein said interpolating means comprises means for executing even number power interpolation, based upon n sampling values preceding an interpolation point and n sampling values succeeding said interpolation point.

* * * * *